United States Patent
Moghbeli et al.

(10) Patent No.: US 9,774,105 B2
(45) Date of Patent: Sep. 26, 2017

(54) EMBEDDED AC MITIGATION SYSTEM

(71) Applicants: Omidreza Moghbeli, Rancho Cucamonga, CA (US); Ian Budner, Upland, CA (US)

(72) Inventors: Omidreza Moghbeli, Rancho Cucamonga, CA (US); Ian Budner, Upland, CA (US)

( * ) Notice: Subject to any disclaimer, the term of this patent is extended or adjusted under 35 U.S.C. 154(b) by 0 days.

(21) Appl. No.: 15/084,397

(22) Filed: Mar. 29, 2016

(65) Prior Publication Data

US 2016/0308290 A1   Oct. 20, 2016

Related U.S. Application Data

(60) Provisional application No. 62/149,220, filed on Apr. 17, 2015.

(51) Int. Cl.
| | |
|---|---|
| *H01R 4/66* | (2006.01) |
| *F16L 57/00* | (2006.01) |
| *F16L 58/00* | (2006.01) |
| *H01R 13/00* | (2006.01) |

(52) U.S. Cl.
CPC ............. *H01R 4/66* (2013.01); *F16L 57/00* (2013.01); *F16L 58/00* (2013.01); *H01R 13/005* (2013.01)

(58) Field of Classification Search
None
See application file for complete search history.

(56) References Cited

U.S. PATENT DOCUMENTS

| | | | | |
|---|---|---|---|---|
| 3,568,128 | A * | 3/1971 | Taylor ................ | H01R 4/64 24/335 |
| 7,906,730 | B2 * | 3/2011 | Atkinson .......... | H01R 13/6592 174/78 |
| 2013/0036604 | A1 * | 2/2013 | Schmidt ............ | F16L 58/1009 29/825 |

* cited by examiner

*Primary Examiner* — Dimary Lopez Cruz
(74) *Attorney, Agent, or Firm* — Kenneth L. Green; Averill & Green

(57) ABSTRACT

An embedded Alternating Current (AC) mitigation system reduces or eliminates induced AC currents on pipelines. When a pipeline runs parallel to power lines, the AC current in the power lines induces AC current in the pipeline. Known coatings applied to the pipelines provides electrical insulation and result in a dangerous or destructive buildup of AC voltage in the pipeline. A combination of the pipeline, a dielectric, and a plate, forms a capacitor. The dielectric may be a coating on the pipe, or a dielectric material deposited on the pipeline and under the plate. The capacitor acts as a decoupler by transmitting AC current to the ground while preserving DC current on the pipeline. The embedded AC mitigation system will further act as grounding system and eliminate the need of adding a grounding system.

19 Claims, 1 Drawing Sheet

EMBEDDED AC MITIGATION SYSTEM

CROSS-REFERENCE TO RELATED APPLICATIONS

The present application claims the priority of U.S. Provisional Patent Application Ser. No. 62/149,220 filed Apr. 17, 2015, which application is incorporated in its entirety herein by reference.

BACKGROUND OF THE INVENTION

The present invention relates generally protection of pipelines and pipeline operators, and in particular to an apparatus and method for embedded Alternating Current (AC) corrosion mitigation.

Overhead electrical transmission lines and pipelines often run in parallel in Right Of Ways (ROWs) due to limited land access. Electrical current can be induced onto the pipelines due to electro magnetic fields created by AC current in the overhead electrical transmission lines near the pipelines. The electrical current induced onto the pipeline is commonly referred to as AC interference. AC interference can create unsafe conditions (electrical shock hazards) for pipeline operators as well as cause a phenomenon called AC corrosion. Both the unsafe conditions and the AC corrosion are the effect of increasing AC voltage/current by induction/fault through the pipeline under the effect of AC interference.

Pipelines are often coated to reduce or prevent chemical and electro chemical corrosion. The coatings also act as electrical insulation and a well coated pipeline generally prevents or reduces leakage of current into surrounding media and allows increased accumulation of AC voltage/current within the pipeline. The increased accumulation of AC voltage/current increases problems caused by the AC voltage/current.

Newly-developed (highly efficient) coatings have increased the dielectric properties of pipelines. Pipelines coated with such coatings are even less electrically lossy to the media around them than pipelines with older and less efficient coatings. As a result, the possibility of increasing AC voltage/current on new pipelines with high efficiency coatings is often considerably higher than from pipelines with older coatings.

A known method for mitigation of the accumulation of AC voltage/current on pipelines is through the use of Direct Current (DC) decouplers and grounding systems as a combination. DC decouplers are basically capacitors including a dielectric material which allows current to pass through the dielectric material when the voltage rises above a certain range. The DC decouplers are also pass the AC current and stop the DC current, so the AC current will be transferred to the grounding system and the DC remain in the line. The DC decouplers include two conductors separated by the dielectric material. The dielectric could be air, glass, paper, a vacuum, a semiconductor, or a dielectric coating. The DC decouplers will hold the DC current inside the pipeline in order to cathodically protect the pipeline from external corrosion, and transfer the AC current to a grounding system. Another known method is to install zinc ribbon anodes along the pipeline section under the effect of AC interference. Unfortunately, these existing methods have not satisfactorily eliminated the dangers and damage cause by the AC voltage/current in pipelines.

BRIEF SUMMARY OF THE INVENTION

The present invention addresses the above and other needs by providing an embedded Alternating Current (AC) mitigation system which reduces or eliminates induced AC currents on pipelines. When a pipeline runs parallel to power lines, the AC current in the power lines induces AC current in the pipeline. New generation coatings applied to the pipelines provides electrical insulation and result in a dangerous or destructive buildup of AC voltage in the pipeline. A combination of the pipeline, a dielectric, and a plate, forms a capacitor. The dielectric may be a coating on the pipe, or a dielectric material deposited on the pipeline and under the plate. The capacitor acts as a decoupler by transmitting AC current to the ground while preserving DC current on the pipeline. The embedded AC mitigation system will further act as grounding system and eliminate the need of adding a grounding system.

In accordance with one aspect of the invention, there is provided an embedded AC mitigation system creating a capacitor resisting a Direct Current (DC) connection between the pipeline and ground. The capacitor acts as a decoupler by transmitting the AC current to the ground and preserving the DC current on the pipeline.

In accordance with another aspect of the invention, there is provided an embedded AC mitigation system including an electrically conductive conformal plate separated from the pipeline by a dielectric semiconductor material or by a coating on the pipeline. The plate is electrically insulated from the pipeline by the dielectric semiconductor material, and/or by a coating on the pipeline.

In accordance with yet another aspect of the invention, there is provided an embedded AC mitigation system acting as grounding system and will eliminate the need of adding a grounding system.

In accordance with yet another aspect of the invention, there is provided an embedded AC mitigation system resolving AC induced current issues in the pipeline system caused by highly-dielectric properties of new-generation coatings and decrease the AC voltage accumulated on the pipeline system in a cost-efficient and safe manner. The present invention also has the capability to control the AC faults by simply applying a semiconductor underneath the plate (in between the pipeline and second plate, preferably on pipeline joints to avoid damaging existing pipeline coatings) as an option the second plate can be attached to a grounding system to decrease the electrical resistance between the plate and media which will help to design and smaller plate to ground the fault current.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
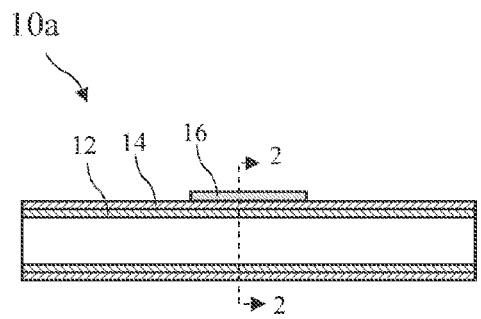
FIG. 1 is a cross-sectional side view of a pipeline including a first embedded AC mitigation system according to the present invention.
Figure 2:
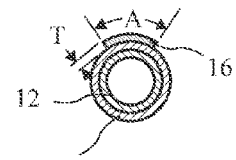
FIG. 2 is a cross-sectional view of the pipeline including the first embedded AC mitigation system according to the present invention, taken along line 2-2 of FIG. 1.

The present invention provides apparatus and method for embedded Alternating Current (AC) mitigation. FIG. 1 shows a cross-sectional side view of a pipeline 12 including a first embodiment of an embedded AC mitigation system 10a comprising a plate 16 attached over a coating on the pipeline 12. The plate 16 is preferably a formable conductive plate and the coating 14 is preferably a high-efficiency (dielectric) coating previously applied on the pipeline surface. The coating 14 preferably covers substantially all of the pipeline, but small portions of the pipeline may remain uncovered due to flaws, damage, welds joining sections of the pipeline, and the like. The coating 14 will act as the dielectric and create a capacitor on top of the pipe. The system 10a will function in a way such that the pipeline 12 itself will act as one conductive plate of the capacitor, the coating 14 will act as the dielectric, and the plate 16 will act as the second conductive plate required for the capacitor. The plate 16 preferably includes formability properties so the plate 16 can completely attach to pipelines 12 having different diameters in order to create the required couple to form a capacitor.

The coating 14 preferably covers substantially all of the pipeline, but small portions of the pipeline may remain uncovered due to flaws, damage, welds joining sections of the pipeline, and the like. The coating 14 is generally a protective coating with high dielectric properties, for example polyurethane, polyethylene, or a multi-layer protective coating based on epoxy.

The plate 16 be any conducive metallic material, and is preferably made from steel or stainless steel. The thickness of the plate 16 is selected so that the plate 16 can be deformed and attach properly to the pipeline 12 surface, and there are no mechanical requirements for the plate 16. The area of the plate 16 may be calculated based on soil resistivity of the area. The surface of the plate 16 is increased as the soil resistivity increases to minimize the electrical resistance between the plate and soil. The plate 16 may also cover the entire pipe circumference, for example, when lower resistance for grounding or higher capacitance is required. In high resistivity soils, to avoid increasing the plate 16 surface area, improved grounding is possible.

Figure 3:
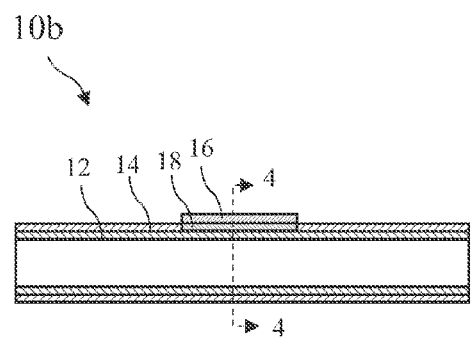
FIG. 3 is a cross-sectional side view of a pipeline including a second embedded AC mitigation system according to the present invention.
Figure 4:
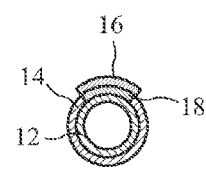
FIG. 4 is a cross-sectional view of the pipeline including the second embedded AC mitigation system according to the present invention, taken along line 4-4 of FIG. 3.

FIG. 3 shows a cross-sectional side view of the pipeline 12 including a second embedded AC mitigation system 10b comprising a semiconductor dielectric material 18 residing directly on the pipeline 12, and the formable conductive plate 16 residing over the semiconductor dielectric material 18. The coating 14 covers the pipeline 12, except for the surface portion covered by the semiconductor dielectric material 18. The combination of the pipeline 12, the semiconductor dielectric material 18, and the plate 16 again creates a capacitor capable of protecting the pipeline and pipeline operator from the fault voltage situations. The semiconductor dielectric material 18 may be applied directly to the pipeline 12 or to a surface of the plate 16 residing against the pipeline 12, and is electrically coupled to both the pipeline 12 and the plate 16. The semiconductor dielectric material 18 may be made from silicon or metal oxide mixed with resin (for example, epoxy) and doped to become a negative type or a positive type material.

The surface area of the plate 16 may be calculated to create a low resistance path for the AC current to be grounded properly based on the average soil resistivity of the location that the conductive plate will be employed.

In specific circumstances, such as high resistivity soils, the plate 16 may be attached to grounding rods/devices as an option to create a more efficient grounding path, or be connected to the pipeline coated with a semi-conductive material to mitigate the fault conditions. In such cases the plates 16 will be designed with a semiconductor dielectric, to compensate for the dielectric needed to establish suitable electrical properties and for mitigating the fault conditions. The application of a semiconductor allows control of the maximum voltage on the pipeline, when voltage increases to dangerous limits the semiconductor will allow all the current to pass and grounded through the second plate.

Figure 5A:
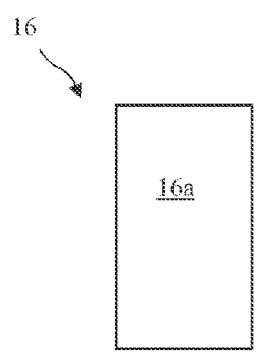
FIG. 5A shows a top view of a plate according to the present invention.
Figure 5B:
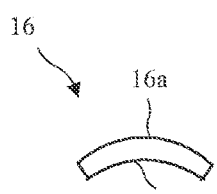
FIG. 5B shows an end view of the plate according to the present invention.

A top view of the plate 16 is shown in FIG. 5A and an end view of the plate 16 is shown in FIG. 5B. A top surface 16a of the plate 16 is exposed to ground, for example surrounding soil, and a conforming bottom surface 16b is in intimate contact with the coating 14 or the semiconductor dielectric material 18. The plate 16 is electrically insulated from the pipeline 12 by the coating 14 and/or by the semiconductor dielectric material 18 to create a capacitor.

Figure 6:
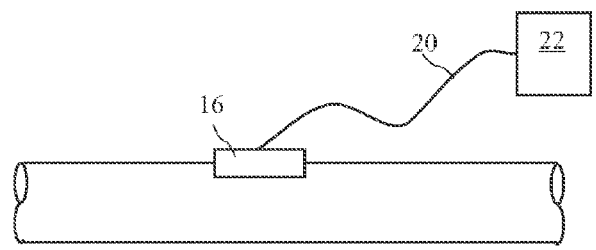
FIG. 6 shows additional grounding connected to the embedded AC mitigation system according to the present invention.

Additional grounding connected to the embedded AC mitigation system is shown in FIG. 6. An electrical cable 20 connects the plate 16 to g rounding apparatus 22.

While the invention herein disclosed has been described by means of specific embodiments and applications thereof, numerous modifications and variations could be made thereto by those skilled in the art without departing from the scope of the invention set forth in the claims.

We claim:

1. An Apparatus for mitigation of induced Alternating Current (AC) in pipelines, comprising:
a continuously electrically conductive pipeline;
a dielectric material coated directly onto the pipeline;
a plate separated from the pipeline by the dielectric material and electrically insulated from the pipeline by the dielectric material; and
an electrical path between the plate and a ground,
wherein a protective coating covers substantially all of the pipeline but does not cover a portion of the pipeline under the plate, the protective coating protecting the pipeline from corrosion.

2. The apparatus of claim 1, wherein the dielectric material is a protective coating covering substantially all of the pipeline.

3. The apparatus of claim 2, wherein the protective coating protects the pipeline from chemical or electrochemical corrosion by acting as a barrier.

4. The apparatus of claim 1, wherein:
the dielectric material is a semiconductor dielectric material; and
a side of the plate towards the pipeline is coated by the dielectric semiconductor material.

5. The apparatus of claim 4, wherein the dielectric semiconductor material is applied to a portion of the pipeline including welded pipeline joints to minimize damage to existing pipeline coatings.

6. The apparatus of claim 1, wherein the diametric material is a dielectric semiconductor material; and
the dielectric semiconductor material is applied to a portion of the pipeline under the plate.

7. The apparatus of claim 1, wherein the dielectric material on the pipeline is in intimate electrical contact with the pipeline.

8. The apparatus of claim 7, wherein the plate is in intimate electrical contact with the dielectric material.

9. The apparatus of claim 8, wherein the plate is a conformal plate, conforming to the shape of the pipeline.

10. The apparatus of claim 8, wherein the plate covers the entire circumference of the pipe.

11. The apparatus of claim 1, wherein the plate is in electric contact with soil surrounding the pipeline.

12. The apparatus of claim 1, wherein the plate is electrically connected to a grounding apparatus by a cable.

13. The apparatus of claim 1, wherein the pipeline is hollow.

14. The apparatus of claim 1, wherein the pipeline includes welded joints joining sections of the pipeline.

15. The apparatus of claim 1, wherein the coating is selected from the group consisting of polyurethane, polyethylene, an a multi-layer protective coating based on epoxy.

16. The apparatus of claim 1, wherein the plate is a conducive metallic material.

17. An Apparatus for mitigation of induced Alternating Current (AC) in pipelines, comprising:
a continuously electrically conductive pipeline;
electrical transmission lines parallel with the pipeline;
induced AC current in the pipeline induced by AC current flowing in the electrical transmission lines;
a dielectric protective coating material covering substantially all of the pipeline;
a conformal plate separated from the pipeline by the dielectric protective coating material and electrically insulated from the pipeline by the dielectric protective coating material;
a capacitor formed by the pipeline; dielectric coating, and the conformal plate; and
an electrical path for the induced AC current between the plate and a ground.

18. An Apparatus for mitigation of induced Alternating Current (AC) in pipelines, comprising:
a continuously electrically conductive pipeline;
a dielectric semiconductor material covering a portion of the pipeline;
a protective coating covering substantially all of the pipeline not covered by the dielectric semiconductor material;
a conformal plate separated from the pipeline by the dielectric semiconductor material, underneath the plate preferably on pipeline joints to avoid damaging existing pipeline coatings, and electrically insulated from the pipeline by the dielectric semiconductor material; and
an electrical path between the plate and a ground.

19. An Apparatus for mitigation of induced Alternating Current (AC) in pipelines, comprising:
a continuously electrically conductive pipeline;
a dielectric material directly onto the pipeline;
a plate separated from the pipeline by the dielectric material or by a semiconductor material and electrically insulated from the pipeline by the dielectric material or by the semiconductor material; and
an electrical path between the plate and a ground,
wherein:
the pipeline is parallel to electrical transmission lines;
induced AC current is induced in the pipeline by AC current flowing in the electrical transmission lines;
the plate, the pipeline, and the material or the semiconductor material between the plate and the pipeline, create a capacitor; and
the electrical path between the plate and a ground provides a path for the induced AC current while preserving DC current on the pipeline.

* * * * *